(12) United States Patent
Fattal

(10) Patent No.: US 8,350,933 B2
(45) Date of Patent: Jan. 8, 2013

(54) METHOD, APPARATUS AND COMPUTER PROGRAM PRODUCT FOR SINGLE IMAGE DE-HAZING

(75) Inventor: Raanan Fattal, Jerusalem (IL)

(73) Assignee: Yissum Research Development Company of the Hebrew University of Jerusalem, Ltd., Jerusalem (IL)

( * ) Notice: Subject to any disclaimer, the term of this patent is extended or adjusted under 35 U.S.C. 154(b) by 318 days.

(21) Appl. No.: 12/756,449

(22) Filed: Apr. 8, 2010

(65) Prior Publication Data

US 2010/0259651 A1  Oct. 14, 2010

Related U.S. Application Data

(60) Provisional application No. 61/202,807, filed on Apr. 8, 2009.

(51) Int. Cl.
*H04N 5/217* (2011.01)

(52) U.S. Cl. .......................................................... 348/241

(58) Field of Classification Search .................. None
See application file for complete search history.

(56) References Cited

U.S. PATENT DOCUMENTS

| | | | | |
|---|---|---|---|---|
| 7,873,235 B2 * | 1/2011 | Steiger | | 382/275 |
| 7,941,004 B2 * | 5/2011 | Zhu et al. | | 382/299 |
| 2010/0067823 A1 * | 3/2010 | Kopf et al. | | 382/274 |
| 2011/0043603 A1 * | 2/2011 | Schechner et al. | | 348/25 |

* cited by examiner

*Primary Examiner* — Luong T Nguyen
(74) *Attorney, Agent, or Firm* — Gregory J. Kirsch

(57) ABSTRACT

A method, apparatus and computer program product are provided for recovering a haze-free image given a single input image. The method may include receiving a single input image I, wherein the input image is made up of a plurality of pixels. A surface radiance vector J of the input image I may be modeled as a product of a surface albedo coefficient R and a shading factor l. The method may further include determining, for each of the plurality of pixels, a value of a transmission t of the pixel, such that a covariance $C_Q$ between the transmission t and the shading factor l is minimized, and recovering the surface radiance vector J based at least in part on the determined value of the transmission t for each pixel.

28 Claims, 9 Drawing Sheets

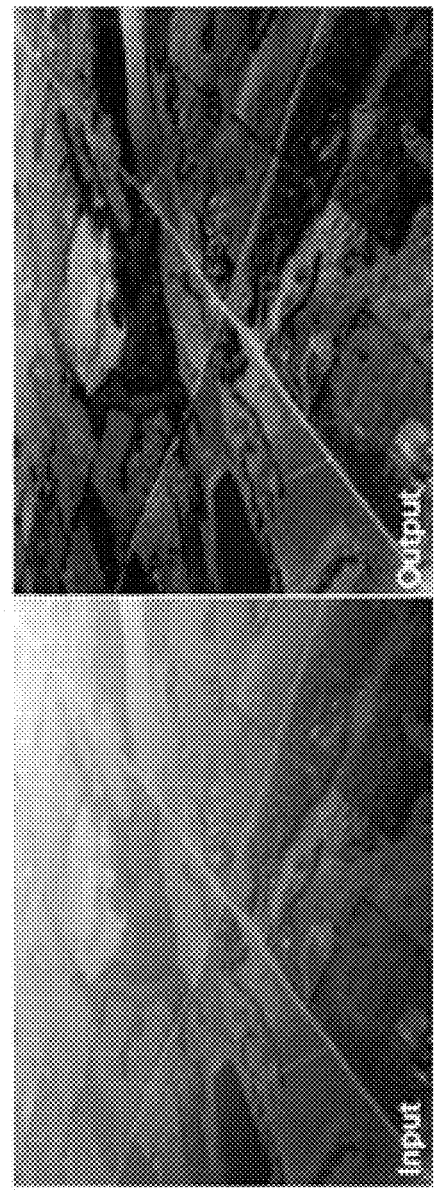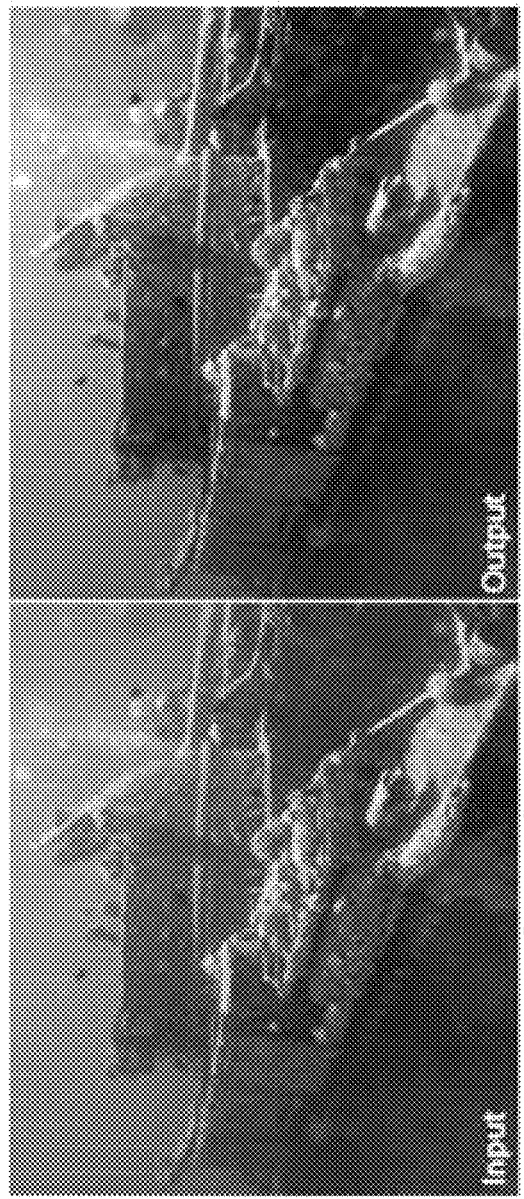

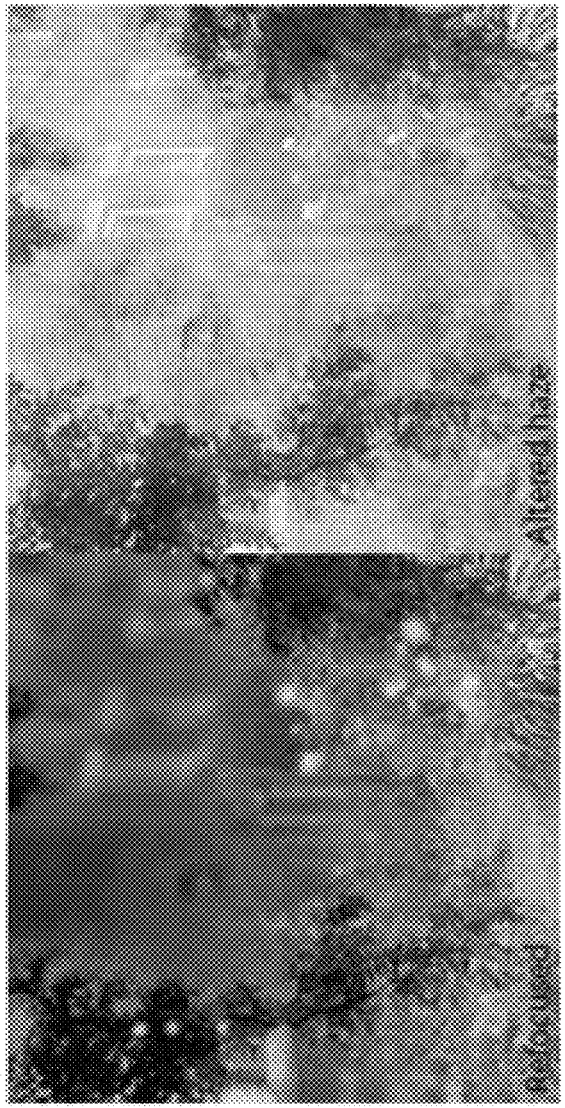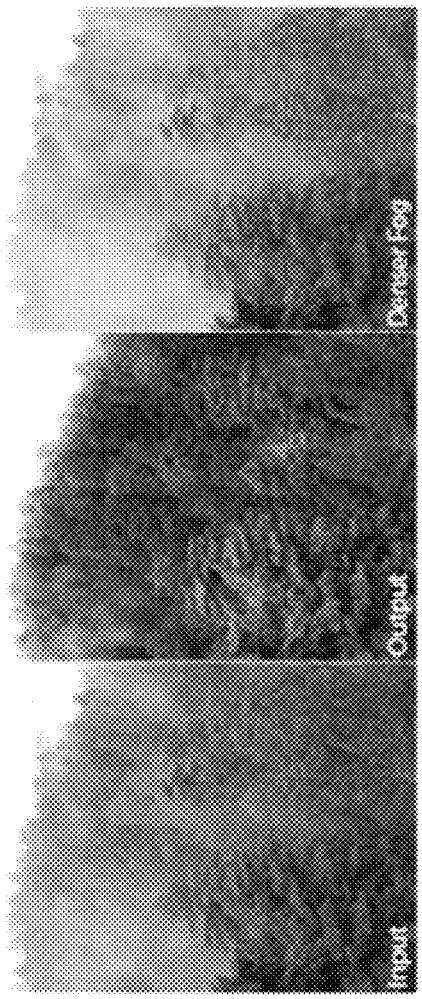
FIG. 6A FIG. 6B FIG. 6C

METHOD, APPARATUS AND COMPUTER PROGRAM PRODUCT FOR SINGLE IMAGE DE-HAZING

CROSS-REFERENCE TO RELATED APPLICATIONS

This application claims priority to, and incorporates in its entirety by reference, U.S. Application Ser. No. 61/202,807 entitled "Single Image Dehazing," filed on Apr. 8, 2009.

FIELD

Embodiments of the invention relate to recovering a haze-free image given a single photograph as an input.

BACKGROUND

In almost every practical scenario in which an image is being captured by a camera, the light reflected from a surface is scattered in the atmosphere before it reaches the camera. This may be due to the presence of aerosols, such as dust, mist, and/or fumes, which deflect light from its original course of propagation. In long distance photography or foggy scenes, this process can have a substantial effect on the image, in which contrasts may be reduced and surface colors may become faint. Such degraded photographs often lack visual vividness and appeal, and moreover, they may offer a poor visibility of the scene contents. This effect may be an annoyance to amateur, commercial, and/or artistic photographers, as well as undermine the quality of underwater and/or aerial photography. This may also be the case for satellite imaging, which is used for many purposes including, for example, cartography and web mapping, land-use planning, archeology, and/or environmental studies.

As discussed in more detail below, in this process light, which should have propagated in straight lines, is scattered and replaced by previously scattered light, called the "airlight" (See Koschmieder, H., "Theorie der horizontalen sichtweite," in *Beitr. zur Phys. d. freien Atm.*, 171-181, 1924, hereinafter "Koschmieder 1924," the contents of which are hereby incorporated herein by reference in their entirety). This can result in a multiplicative loss of image contrasts, as well as an additive term due to this uniform light. As described in more detail below, a model that is commonly used to formalize the image formation in the presence of haze factors the degraded image into a sum of two components: the airlight contribution and the unknown surface radiance. Algebraically these two, three-channel color vectors are convexly combined by the transmission coefficient, which is a scalar specifying the visibility at each pixel. Recovering a haze-free image using this model requires the determination of the three surface color values, as well as the transmission value at every pixel. Since the input image provides three equations per pixel, the system is ambiguous and the transmission values cannot be determined. A formal description of this ambiguity is described below. However, intuitively it follows from the inability to answer the following question based on a single image: are we looking at a deep red surface through a thick white medium, or is it a faint red surface seen at a close range or through a clear medium. In the general case, this ambiguity, which is referred to as the "airlight-albedo ambiguity," holds for every pixel and cannot be resolved independently at each pixel given a single input image.

A need, therefore, exists, for a technique for resolving this ambiguity and, as a result, de-hazing a captured image, using only the information obtainable from the captured image itself.

BRIEF SUMMARY

Embodiments of the present invention provide an improvement by providing, among other things, a new method for estimating the optical transmission in hazy scenes given a single input image. Based on this estimation, the scattered light can be eliminated to increase scene visibility and recover haze-free scene contrasts. In the approach of one embodiment, a refined image formation model may be formulated that can account for surface shading in addition to the transmission function. This allows ambiguities in the data to be resolved by searching for a solution in which the resulting shading and transmission functions are locally statistically uncorrelated. A similar principle can be used to estimate the color of the haze. Results, which are discussed below, demonstrate the ability of embodiments described herein to remove the haze layer, as well as provide a reliable transmission estimate that can be used for additional applications, such as image refocusing and/or novel view synthesis.

According to one aspect, a method of recovering a haze-free image given a single input image is provided. In one embodiment, the method may include: (1) receiving, from an image capture device, a single input image I comprising a plurality of pixels; (2) modeling a surface radiance vector J of the input image I as a product of a surface albedo coefficient R and a shading factor l; (3) determining, by a processor for each of the plurality of pixels, a value of a transmission t of the pixel, such that a covariance $C_\Omega$ between the transmission t and the shading factor l is minimized; and (4) recovering, by the processor, the surface radiance vector J based at least in part on the determined value of the transmission t for each pixel.

According to another aspect, an apparatus for recovering a haze-free image given a single input image is provided. In one embodiment, the apparatus may include a processor configured to: (1) receive, from an image capture device, a single input image I comprising a plurality of pixels; (2) model a surface radiance vector J of the input image I as a product of a surface albedo coefficient R and a shading factor l; (3) determine, for each of the plurality of pixels, a value of a transmission t of the pixel, such that a covariance $C_\Omega$ between the transmission t and the shading factor l is minimized; and (4) recover the surface radiance vector J based at least in part on the determined value of the transmission t for each pixel.

According to yet another aspect, a computer program product for recovering a haze-free image given a single input image is provided. The computer program product contains at least one computer-readable storage medium having computer-readable program code portions stored therein. The computer-readable program code portions of one embodiment may include: (1) a first executable portion for receiving, from an image capture device, a single input image I comprising a plurality of pixels; (2) a second executable portion for modeling a surface radiance vector J of the input image I as a product of a surface albedo coefficient R and a shading factor l; (3) a third executable portion for determining, for each of the plurality of pixels, a value of a transmission t of the pixel, such that a covariance $C_\Omega$ between the transmission t and the shading factor l is minimized; and (4) a fourth executable portion for recovering the surface radiance vector J based at least in part on the determined value of the transmission t for each pixel.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIGS. 1A-1C illustrate de-hazing based on a single input image and the corresponding depth estimate in accordance with an embodiment described herein;

FIGS. 2A-2G provide a synthetic example of embodiments described herein, wherein FIGS. 2A-2D illustrate the input image, the recovered transmission t and shading l, and the recovered J, respectively; and FIGS. 2E-2G illustrate the results obtained using a wrong η, where the correlation between t and l is apparent;

FIGS. 3A-3C illustrate an input image and the output produced by the approach of embodiments described herein;

FIG. 4 provides a random graph model illustrated in one dimension in accordance with embodiments described herein;

FIGS. 5A-5D illustrate the result of de-hazing in accordance with an embodiment described herein on aerial and underwater photography;

FIGS. 6A-6C illustrate additional applications of embodiments of the present invention, wherein in FIG. 6A, a virtual focus plane is simulated, whereas the image of FIG. 6B is rendered with a recolored haze layer multiplied by a random noise;

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Figure 1C:
Figure 1B:
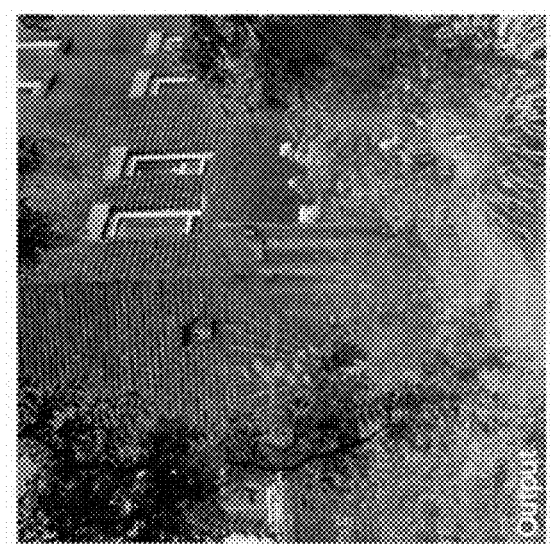
Figure 1A:

Overview:

Embodiments of the present invention provide a method for recovering a haze-free image given a single photograph as an input. In particular, according to one embodiment, the input image may be interpreted through a model that accounts for surface shading in addition to the scene transmission. Based on this refined image-formation model, the image can be broken into regions of a constant albedo, and the airlight-albedo ambiguity can be resolved by deriving an additional constraint, wherein the surface shading and medium transmission functions may be locally statistically uncorrelated. In one embodiment, the shading component may vary significantly compared to the noise present in the image. A graphical model may further be used to propagate the solution to pixels in which the signal-to-noise ratio falls below an admissible level that can be derived analytically (discussed below). The airlight color can also be estimated using this uncorrelation principle. The method of one embodiment may be passive. In other words, according to one embodiment, the method may not require multiple images of the scene, any light-blocking based polarization, any form of scene depth information, or any specialized sensors or hardware. The method of one embodiment may have the minimal requirement of a single image acquired by an ordinary consumer camera, or similar image capture device. In addition, according to one embodiment, the method of embodiments described herein may not assume the haze layer to be smooth in space, i.e., discontinuities in the scene depth or medium thickness are permitted. As shown in FIGS. 1A-1C, which illustrate the dehazing and depth estimate accomplished by an embodiment described herein, despite the challenges this problem poses, the method of embodiments described herein can achieve a significant reduction of the airlight and restore the contrasts of complex scenes. Based on the recovered transmission values, scene depths can be estimated and used for other applications that are described below.

Image Degradation Model:

Light passing through a scattering medium is attenuated along its original course and is distributed to other directions. This process is commonly modeled mathematically by assuming that along short distances there is a linear relation between the fraction of light deflected and the distance traveled. More formally, along infinitesimally short distances dr the fraction of light absorbed is given by βdr where β is the medium extinction coefficient due to light scattering. Integrating this process along a ray emerging from the viewer, in the case of a spatially varying β, gives $$t = \exp\left(-\int_0^d \beta(r(s))ds\right), \quad (1)$$

where r is an arc-length parametrization of the ray. The fraction t is called the transmission and expresses the relative portion of light that managed to survive the entire path between the observer and a surface point in the scene, at r(d), without being scattered. In the absence of black-body radiation the process of light scattering conserves energy, meaning that the fraction of light scattered from any particular direction is replaced by the same fraction of light scattered from all other directions. The equation that expresses this conservation law is known as the Radiative Transport Equation (See Rossum M. V., et al., "Multiple scattering of classical waves: microscopy, mesoscopy and diffusion," vol. 71, 313-371, 1999, the contents of which are hereby incorporated herein by reference in their entirety). Assuming that this added light is dominated by light that underwent multiple scattering events, allows for the approximation of the added light as being both isotropic and uniform in space. This constant light, known as the "airlight" (Koschmieder 1924) or also as the "veiling light," can be used to approximate the true in-scattering term in the full radiative transport equation to achieve the following simpler image formation model $$I(x)=t(x)J(x)+(1-t(x))A, \quad (2)$$

where this equation is defined on the three RGB color channels. I stands for the observed image, A is the airlight color vector, J is the surface radiance vector at the intersection point of the scene and the real-world ray corresponding to the pixel x=(x, y), and t(x) is the transmission along that ray. This degradation model is commonly used to describe the image formation in the presence of haze. As with similar works using this degradation model, a goal of embodiments of the present invention is to recover J, which is an image showing the scene through a clear haze-free medium. By that, other effects the haze may have on the scene, such as a change in overall illumination which in turn affects the radiant emittance, are not eliminated. Also, embodiments of the present invention assume that the input image I is given in the true scene radiance values. These radiance maps can be recovered by extracting the camera raw data or inverting the overall acquisition response curve, as described in Debevec, P. E., et al., "Recovering high dynamic range radiance maps from photographs," In *ACM SIGGRAPH* 1997, 369-378, the contents of which are hereby incorporated herein by reference in their entirety.

This model (2) explains the loss of contrasts due to haze as the result of averaging the image with a constant color A. If the contrasts in the image are measured as the magnitude of the image's gradient field, a scene J seen through a uniform medium with $t(x)=t<1$ yields $$\|\nabla I\| = \|t\nabla J(x) + (1-t)\nabla A\| = t\|\nabla J(x)\| \leq \|\nabla J(x)\| \quad (3)$$

Constant Albedo Images:

The airlight-albedo ambiguity exists in each pixel independently and gives rise to a large number of undetermined degrees of freedom. To reduce the amount of this indeterminateness, embodiments of the present invention simplify the image locally by relating nearby pixels together. This can be done in two steps. In the first step, the unknown image J can be modeled as a pixelwise product of surface albedo coefficients and a shading factor, Rl, where R is a three-channel RGB vector of surface reflectance coefficients and l is a scalar describing the light reflected from the surface. This refined model can be used to simplify the image by assuming that $R(x)$ is piecewise constant. In this section, one of these localized sets of pixels $x \in \Omega$ that share the same surface albedo, i.e., pixels in which $R(x)=R$ for some constant vector R, is considered. At these pixels, the standard image formation model (2) becomes $$I(x) = t(x)l(x)R + (1-t(x))A. \quad (4)$$

Instead of having three unknowns per pixel in $J(x)$, there are now only two unknowns $l(x)$ and $t(x)$ per pixel plus another three constants in R. Embodiments of the present invention may proceed by breaking R into a sum of two components, one parallel to the airlight A and a residual vector R' that lies in the linear sub-space which is orthogonal to the airlight, $R' \in A^\perp$. In terms of these normalized components, the equation above becomes $$I(x) = t(x)l'(x)(R'/\|R'\| + \eta A/\|A\|) + (1-t(x))A, \quad (5)$$

where $l'=\|R'\|l$ and $\eta = \langle R, A \rangle / (\|R'\| \|A\|)$ measuring the component that is mutual to the surface albedo and the airlight. By $\langle \cdot, \cdot \rangle$ the standard three-dimensional dot-product in the RGB space can be denoted. In order to obtain independent equations, embodiments of the present invention can project the input image along the airlight vector, which results in a scalar given by $$I_A(x) = \langle I(x), A \rangle / \|A\| = t(x)l'(x)\eta + (1-t(x))\|A\|, \quad (6)$$

and project along R', which equals to the norm of the residual that lies within $A^\perp$, i.e., $$I_{R'}(x) = \sqrt{\|I(x)\|^2 - I_A(x)^2} = t(x)l'(x). \quad (7)$$

The transmission t can then be written in terms of these two quantities as $$t(x) = 1 - (I_A(x) - \eta I_{R'}(x))/\|A\|. \quad (8)$$

In this equation the airlight-albedo ambiguity is made explicit; assuming for the moment that there is some estimate for the airlight vector A, the image components $I_A(x)$ and $I_{R'}(x)$ give two constraints per pixel $x \in \Omega$, while there are two unknowns per pixel $l(x)$ and $t(x)$ plus an additional unknown constant $\eta$. A third equation cannot be obtained from l since, according to the model of embodiments described herein, any vector in $A\perp$ yields the same equation as $I_{R'}$. Thus, this model (5) reduces the pointwise ambiguity into a problem of determining a single scalar $\eta$ for all $x \in \Omega$. Finding this number, that expresses the amount of airlight in R', enables the recovery of the transmission from (8) and ultimately the output image J according to (2).

A technique for resolving the airlight-albedo ambiguity in this reduced form according to one embodiment is now described. According to this embodiment, the transmission t depends on the scene depth and the density of the haze, $\beta(x)$, while the shading l depends on the illumination in the scene, surface reflectance properties, and scene geometry. Therefore it is reasonable to expect that the object shading function l and the scene transmission t do not exhibit a simple local relation. This leads to the assumption that the two functions are statistically uncorrelated over $\Omega$, meaning that $C_\Omega(l, t)=0$, where the sample covariance $C_\Omega$ is estimated in the usual way $$C_\Omega(f, g) = |\Omega|^{-1} \sum_{x \in \Omega} (f(x) - E_\Omega(f))(g(x) - E_\Omega(g)), \quad (9)$$

and the mean by $$E_\Omega(f) = |\Omega|^{-1} \sum_{x \in \Omega} f(x). \quad (10)$$

A simpler formulation can be obtained by expressing this lack of correlation between t and 1/l' instead (if X and Y are two independent random variables then so are $f(X)$ and $g(Y)$ for every pair of continuous functions $f$ and $g$), where the latter can be given by $$(l'(x))^{-1} = (1 - (I_A(x) - \eta I_{R'}(x))/\|A\|)/I_{R'}(x) \quad (11)$$
$$= \frac{1 - I_A(x)/\|A\|}{I_{R'}(x)} + \eta/\|A\|.$$

If a new variable is defined as $$h(x) = (\|A\| - I_A)/I_{R'}, \quad (12)$$

substitute (8) and (11) into the covariance operator, and extract $\eta$, embodiments of the present invention finally get that $$\eta = \frac{C_\Omega(I_A, h)}{C_\Omega(I_{R'}, h)}. \quad (13)$$

This function can be computed given the input image and, as explained earlier, $\eta$ allows for the computation of the transmission from (8) and the recovery of the unknown image J according to (2). The procedure described here is, in essence, an independent component analysis (See Hyvrinen, A., et al., "Independent component analysis: Algorithms and applications," *Neural Networks* 13, 411-430, 2000, the contents of which are hereby incorporated herein by reference in their entirety). Unlike certain models, equation (13) fully determines η and decorrelates l and t. This is true as long as the denominator $C_\Omega(I_{R'},h)$ is non-zero, which can be ensured in a manner described below.

Figures 2A, 2B, 2C, 2D:
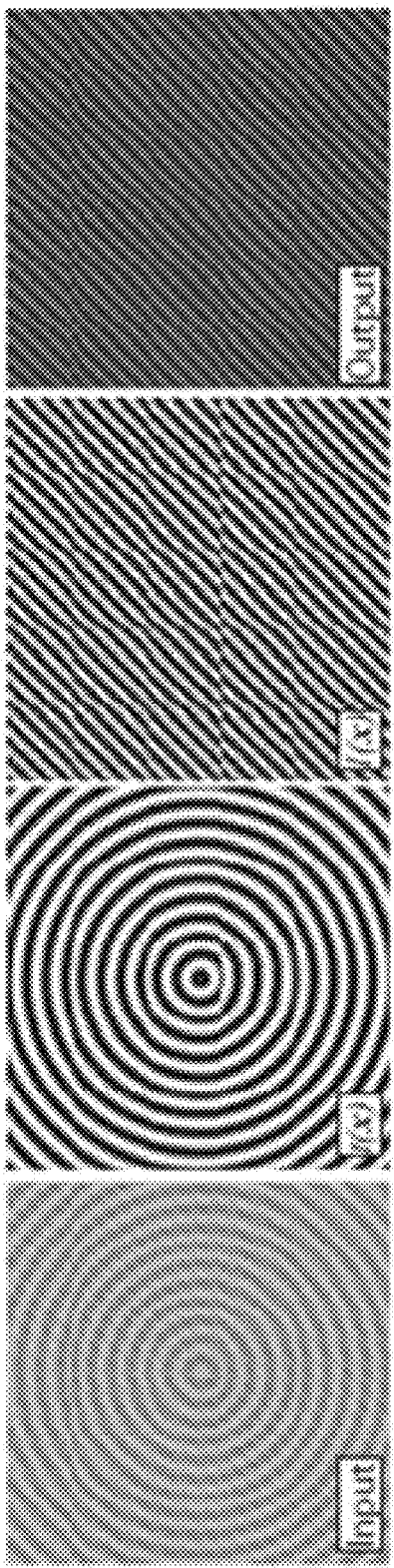
Figures 2E, 2F, 2G:
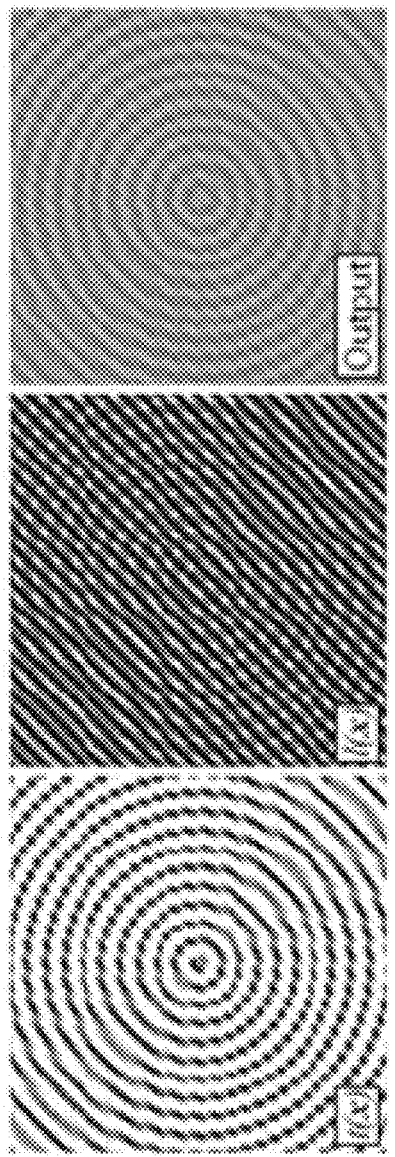

In FIGS. 2A-2G a synthetic example can be seen where the shading l consists of vertical ripples and the transmission t is made of radial ones. In particular, FIGS. 2A-2D illustrate the input image, the recovered transmission t and shading l, and finally the recovered J, respectively. FIGS. 2E-2G illustrate the results obtained when using a wrong η, where the correlation between t and l is apparent. As shown, when estimating η from (13) these functions are accurately recovered, whereas the ones computed based on a false η appear to be mixed together, i.e., correlated.

Noise Estimation:

Unfortunately, as one of ordinary skill in the art will recognize, no measurement comes free of noise, including the input image I. This error, or lack of data, in the input can play a role in this inverse problem of recovering a faint signal masked by haze. This noise introduces an uncertainty into the estimation of η by (13) and, therefore, into t as given by (8). In order to use the estimated transmission later, with the right amount of confidence, the amount of error contained in the estimated transmission may need to be assessed. In one embodiment, this can be done by modeling the error present in I as an additive white Gaussian noise. More specifically, it can be assumed that $I=\tilde{I}+\xi$, where $\xi$ is a three dimensional vector of random Gaussian variables, which is independent both component-wise and pixel-wise, with zero mean and variance $\sigma^2$. The propagation of $\xi$, starting from I through the calculation of η up to t, is described below, and an expression that is linear in $\xi$ is obtained. This linearity may mean that, at the end, a Gaussian noise whose variance $\sigma_t^2$ can be computed may be left. In this section, how this information is factored into the estimation of the final t, in accordance with one embodiment of the present invention, is described.

Along the derivation of the error estimate, given in detail below, several conditions which allow for the truncation of Taylor expansions are assumed to hold. Here these conditions are listed, along with a brief explanation as to why they are likely unavoidable and not merely artificial byproducts of the error formulation or analysis. The first condition may require the noise variance $\sigma^2$ to be less than the three components of I/10 and also less than $I_R/6$, which is the haze-free component of the input. These are basic signal-to-noise requirements stating that data must be available and that pixels which are too opaque, compared to σ, contain little or no information about J. The second condition may require the variance of the noise term $\xi C_{R'}$ to be less than $(C_\Omega(I_{R'},h)/5)^2$, where $\xi C_{R'}$ is the noise present in $C_\Omega(I_{R'},h)$, which is defined below. This condition breaks down when $|\Omega|$ is too small and there is not enough averaging to reduce the variance in $\xi C_{R'}$, or when there is not enough variation in l, which appears both in $I_{R'}$ and h. Intuitively, these conditions ensure the stability of the statistics $E_\Omega$ and $C_\Omega$ over $\Omega$ and the availability of enough multiplicative variation in $I_{R'}$, which is needed to resolve airlight-albedo ambiguity. These conditions are used in the way predictions are made in embodiments described herein and are explicitly quantified by this noise model.

The above is not meant to justify or assume that any of these conditions actually hold. On the contrary, every pixel that does not meet these error estimation criteria may be omitted. And as the discussion above suggests, these pixels may be discarded for not containing reliable information on top of violating conditions needed to evaluate the error they contain. The set of these discarded pixels can be denoted by $\mathscr{B}$. As shown below, the estimate of t at the rest of the pixels $x\notin\mathscr{B}$ may contain zero-mean Gaussian noise with a variance $\sigma_t^2$, defined below. This error estimate can be used, as described in the next section, to extrapolate t for all x, needed for computing the output image J, when embodiments of the present invention are extended to handle images with multiple albedo values.

Given an input image, a σ that best approximates the variance of the noise present in the input image may need to be supplied. In one embodiment, this may be left for the user to set. In the experiments described herein a σ=1/100-1/200 was used (for images with pixel values ranging between zero and one), though other values of σ are contemplated within the scope of embodiments of the invention. Pixels with low signal-to-noise ratios were either discarded or received a high $\sigma_t^2$, meaning that, according to embodiments described herein, this parameter need not be precise.

Multi-Abedo Images:

In the previous section the restricted case in which it was assumed that all the pixels correspond to the same surface, i.e., a constant albedo value R(x)=R, and hence result in a constant airlight-albedo mutual component η was considered. In order to handle general images, containing surfaces with different reflectance values, according to one embodiment described herein, these evaluations can be performed on a pixel basis using robust estimators defined on neighboring pixels. For that pixels can be related based on their similarity in albedo using the following shading and airlight invariant measure. A naive haze-free image can be computed by $I'=I-AI_A/\|A\|$ (which may contain negative values) and projected onto the two chroma channels U and V of the YUV color space. Since embodiments described herein are not interested in differentiating pixels based on their shading, a single chroma channel can be extracted based on the ratio of these projections $$\theta(x)\tan^{-1}(\langle I',U\rangle/\langle I',V\rangle). \tag{14}$$

This maps pixel color into angles where distances can be measured by the length of the shortest arc, i.e., $$d(\theta_1,\theta_2)=\min\{|\theta_1-\theta_2|,2\pi-|\theta_1-\theta_2|\}. \tag{15}$$

This similarity measure can be used to define the weights of the following w-estimators (See Andrews et al., *Robust Estimates of Location: Survey and Advances*, Princeton University Press; London, Oxford University Press, 1972, the contents of which are hereby incorporated herein by reference in their entirety)

$$C_x(f,g)=\frac{1}{W_x}\sum_{y\in\Omega_x}(f(y)-E_x(f))(g(y)-E_x(g))w(x,y), \tag{16}$$

$$\text{and } E_x(f)=\frac{1}{W_x}\sum_{y\in\Omega_x}f(y)w(x,y),$$

where the weighting function w(x,y) is given by $\exp(-d(\theta(x),\theta(y))^2/\sigma_\theta^2)$ the normalizing weight $W_x=\Sigma_{y\in\Omega_x}w(x,y)$, and $\Omega_x$ is the window of pixels centered around x excluding pixels from $\mathscr{B}$. In the testings described herein $\sigma_\theta$ is set to ⅛ and windows of 24-by-24 pixels, which can be enlarged in case of noisy images, are used. $E_\Omega$ and $C_\Omega$ are replaced in (13) with these robust estimators and η(x) is computed at every pixel $x\notin\mathscr{B}$. The transmission can be computed at these pixels according to (8), and this primary estimate can be denoted by $\hat{t}$. As noted earlier, below the estimated noise variance $\sigma_t^2$ present in these estimated transmission values is computed.

Figure 4:
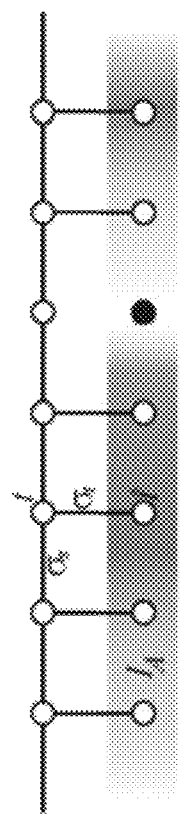

Embodiments of the present invention can proceed with a statistical smoothing to account for the noise present in $\hat{t}$ and to fill in the transmission values at pixels $x \in \mathcal{B}$. The airlight contribution is fully contained in $I_A$ and can therefore be used as a prior to derive the spatial regularity of t. Embodiments of the present invention assume independence between these dependencies and formalize them using a Gauss-Markov random field model (See Pérez, P., "Markov random fields and images," in *CWI Quarterly*, vol. 11, 413-437 1998, the contents of which are hereby incorporated herein by reference in their entirety), defined by $$P(t) \propto \prod_x e^{-(t(x)-\hat{t}(x))^2/\sigma_{\hat{t}}^2(x)} \prod_{\forall x,y \in N_x} e^{-(t(x)-t(y))^2/(I_A(x)-I_A(y))^2/\sigma_s^2}, \quad (17)$$

where $N_x$ is the set of pixel x's four nearest-neighbors in the lattice and use $\sigma_s = \frac{1}{5}$. The links defined by this model are illustrated in FIG. 4. The model illustrated in FIG. 4 links the unknown transmission variables t to the estimated values $\hat{t}$ as well as to neighboring ones. Unreliable pixels for which the error cannot be assessed are not linked. The airlight image $I_A$, from which the spatial dependencies are derived, is depicted by the lower strip.

According to embodiments described herein, this model can be maximized by solving the linear system resulting from d log P/dt=0 and taking this optimum to be the final t which can be used to recover the final haze-free output image J from (2).

Estimating the Airlight Color:

According to one embodiment described herein, the principle of uncorrelation, described above, can be applied once again in order to estimate the airlight color vector A. One possibility may be to restrict to small windows of constant albedo and search for a vector A that yields the least correlated t and l. This is based on a need for consistency between the equations derived and the input pixels; the airlight vector used in equations (8), (11), and (12) should be identical to the airlight present in the input pixels so that the t and l resulting from the computations described herein will indeed be uncorrelated. If this is not the case, the η computed from (13) and meant to achieve zero correlation, is meaningless. Thus given an initial guess for A, $C(J, t)^2$ can be minimized by updating A's components using the steepest descent method. This process can be done within small windows of 24-by-24 pixels and may take a few seconds to perform. In one embodiment, the most haze-opaque pixel can be used as an initial guess.

This three-dimensional minimization can be reduced to a one dimensional search if two or more regions that correspond to different but uniform albedos are selected. As indicated by (4), in such regions all the pixels lay within a two-dimensional linear sub-space spanned by the vectors R and A. A principal component analysis will not extract the directions of these vectors since their coefficients tl and −t are not independent. Nevertheless, embodiments of the present invention can use this analysis in order to find the sub-spaces themselves by omitting the least-active component of the three. This can be applied in each of the given regions, indexed by i, and the two spanning components can be denoted by $v^i_1$ and $v^i_2$. Since A is expected to be contained in each of these sub-spaces, its direction can be recovered by intersecting these planes. This can be done by searching for a vector with the highest projection onto all these sub-spaces, i.e., $$\max_A \sum_i \langle A, v^i_1 \rangle^2 + \langle A, v^i_2 \rangle^2 \text{ such that } \|A\|^2 = 1 \quad (18)$$

The solution to this problem, according to the Lagrange-multipliers rule, can be given by the eigenvector that corresponds to the highest eigenvalue of the 3-by-3 matrix given by $\Sigma_i v^i_1 (v^i_1)^T + v^i_2 (v^i_2)^T$. The search described above, where $C(J, t)^2$ is minimized, can now be used, in accordance with an embodiment described herein, to find the magnitude of A. This is a one-dimensional optimization problem which can be solved using a naive search and can take less than one second.

Figures 3A, 3B, 3C:
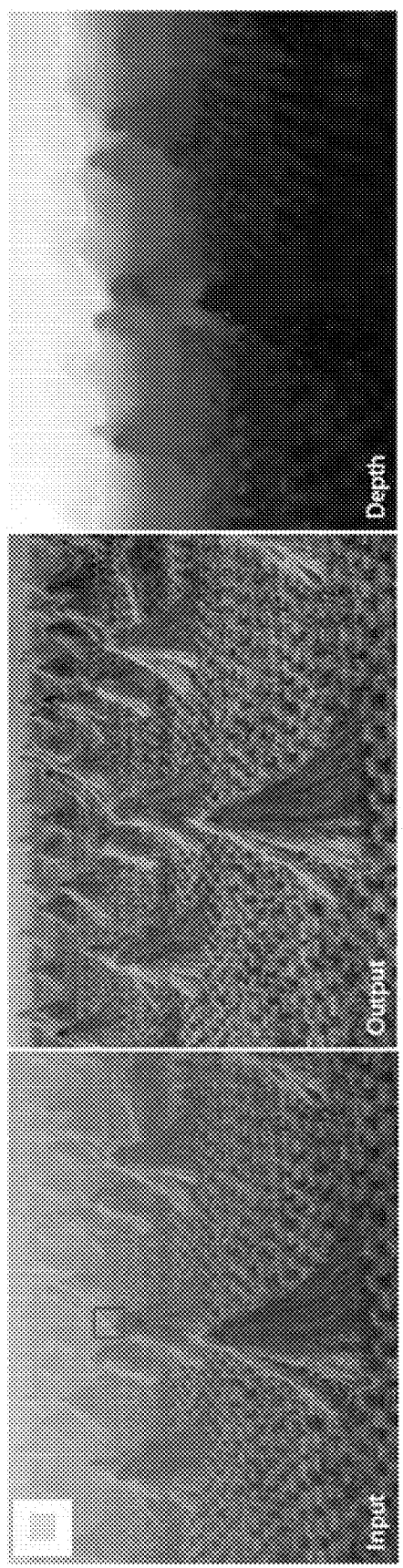

Results:

In FIGS. 3A-3C, an input image and the output produced by the approach of embodiments described herein are shown, wherein the estimated airlight is shown in the top-left corner of the input image (i.e., FIG. 3A). Also shown are the scene depth values computed by $d = -\log t/\beta$, which follows from (1) when assuming a spatially uniform extinction coefficient $\beta(r) = \beta$. These depth values can be defined up to an unknown multiplicative constant $1/\beta$. As discussed above, in FIGS. 1A-1C, the result for a more complicated image with surfaces of distinct albedos is shown. As mentioned earlier, aerial and underwater photography may also be prone to scattering artifacts, and in FIGS. 5A-5D, the results for these types of images are shown.

Figure 7:
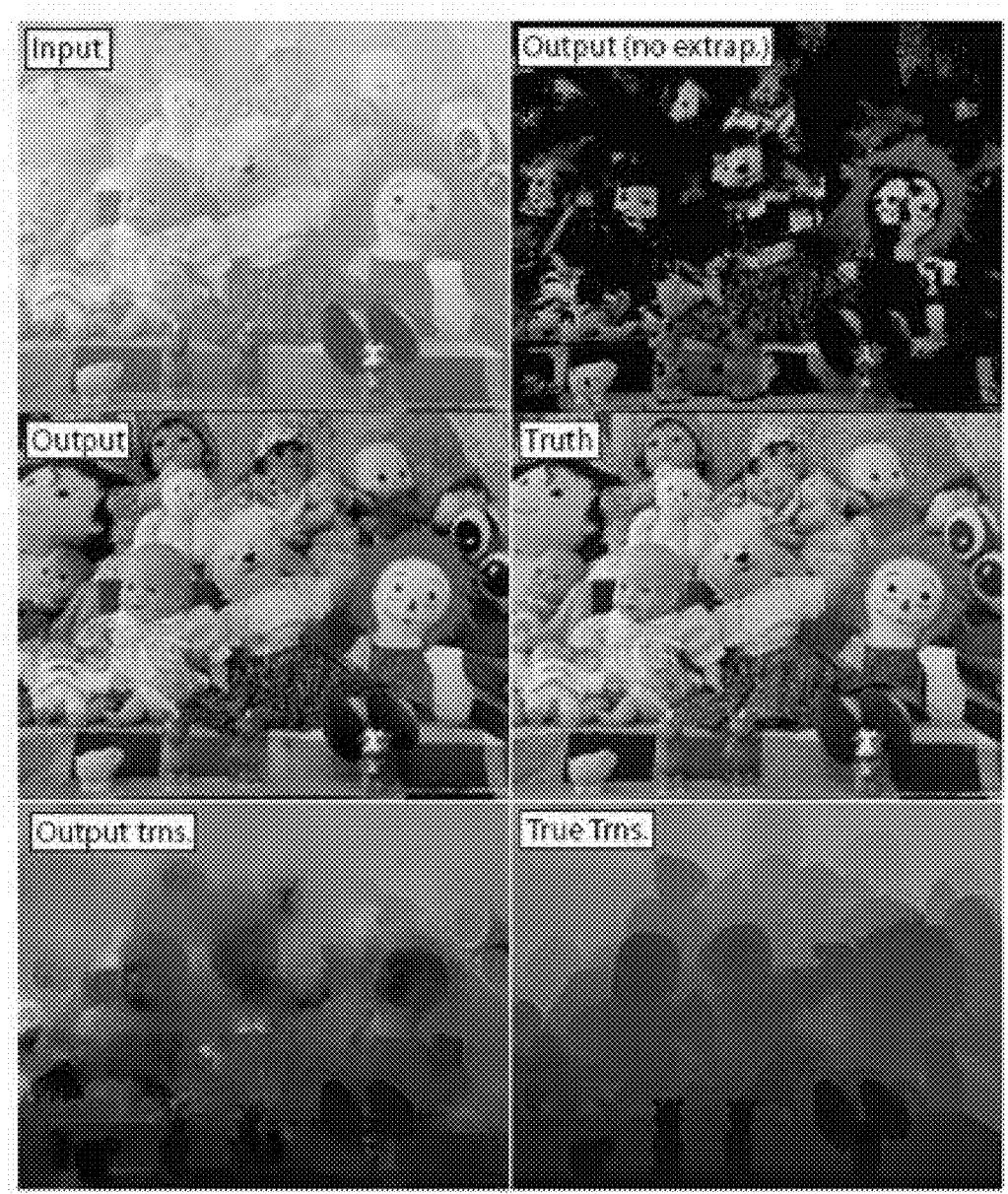
FIG. 7 illustrates the results of embodiments described herein on a real scene where the groundtruth solution is known.
Figure 8A:
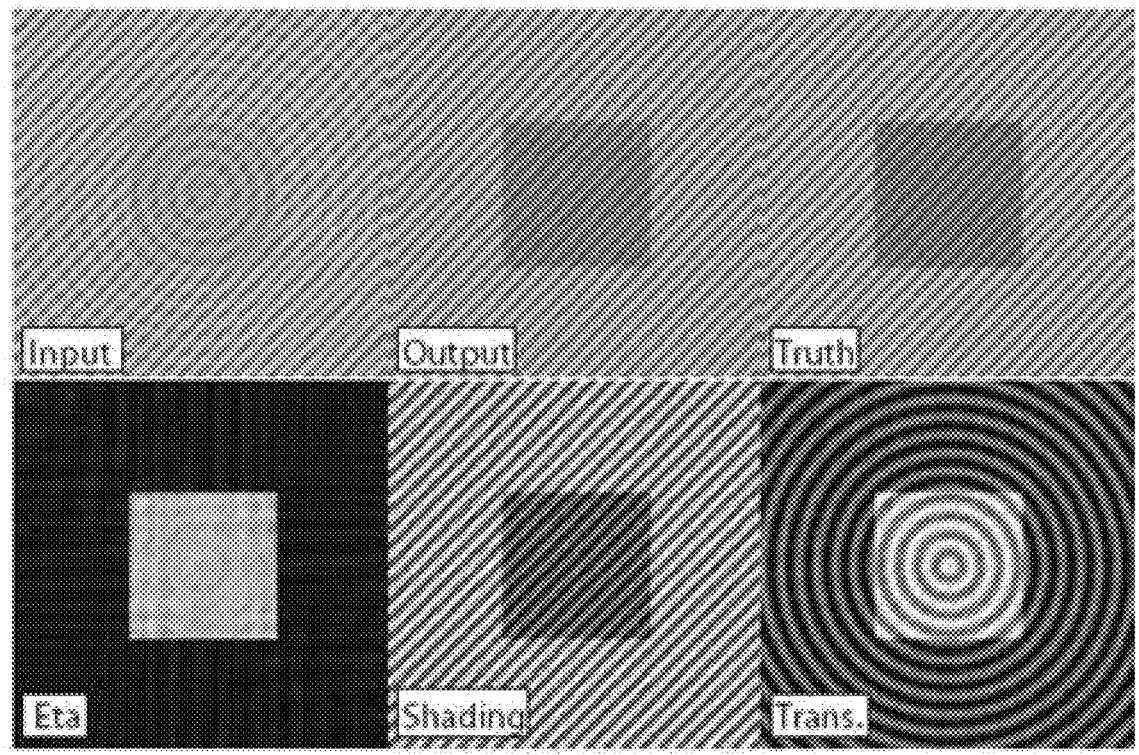
FIGS. 8A and 8B illustrate the results of a disambiguation test in accordance with an embodiment described herein.
Figure 8B:
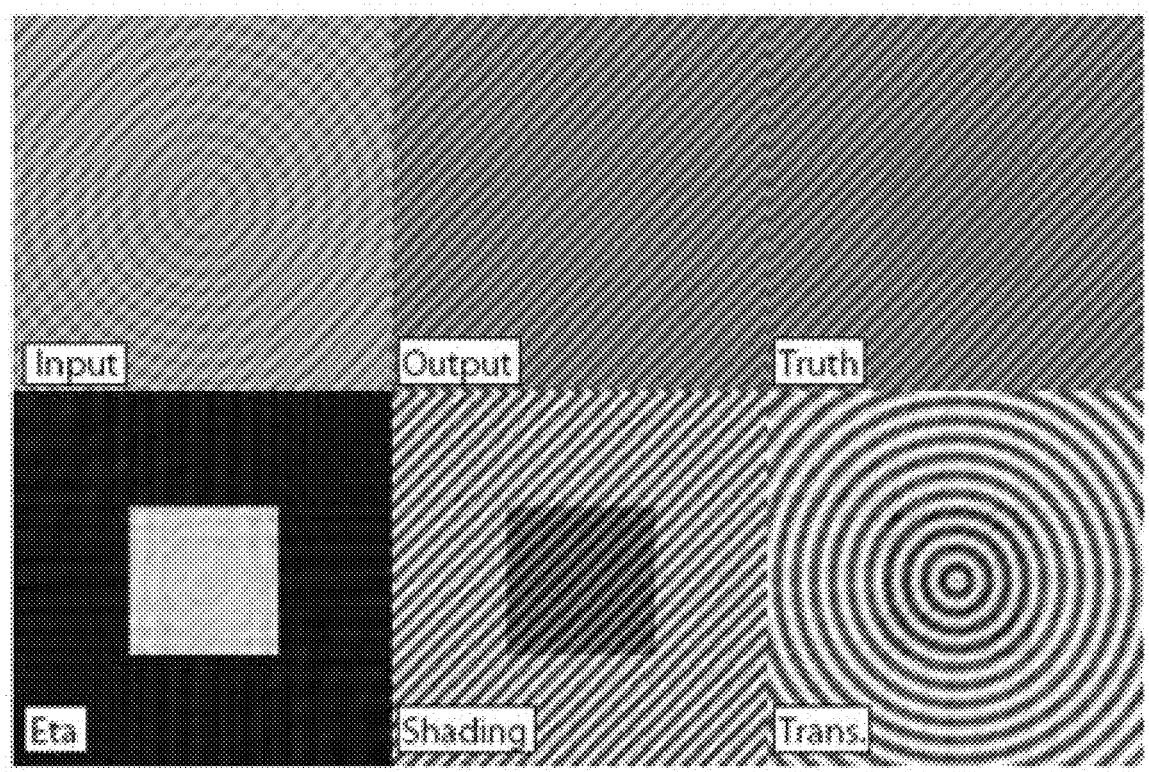

In FIG. 7, the results on a real scene where the groundtruth solution is known are shown. The mean absolute error in estimated transmission of the image shown is $43 \times 10^{-3}$ and $68 \times 10^{-3}$ in J. The example shown is synthesized from an image and its corresponding disparity map, which were used to create the scene transmission. This image is taken from Hirschmiller, H., et al., "Evaluation of cost functions for stereo matching," 2007, the contents of which are hereby incorporated herein by reference in their entirety. The result is overall quite satisfactory. The mean absolute error in transmission and haze-free image J are both less than 7%. In another test (a disambiguation test), shown in FIGS. 8A and 8B, two images are shown, wherein the transmission mean absolute error is $56 \times 10^{-4}$ and $13 \times 10^{-3}$ in the tests of FIGS. 8A and 8B, respectively. The image of FIG. 8A has its middle square masked by a thicker haze, and in the image of FIG. 8B the square is slightly brighter exactly in the direction of the airlight. It is hard to tell this difference visually, yet the method of one embodiment of the present invention is able to disambiguate the two scenarios and provide near perfect decompositions.

The predicted transmission function t(x) may be used for other applications in addition to haze removal. In particular, in FIGS. 6A-6C an image simulating a denser medium by multiplying the extinction coefficient $\beta$ by a factor of $\lambda=2$ is shown. According to (1) this is achieved by applying the following simple power law transformation of the transmission values $$e^{-\int \lambda \beta(s) ds} = e^{-\lambda \int \beta(s) ds} = (e^{\int \beta(s) ds})^\lambda = t^\lambda. \quad (19)$$

FIGS. 6A-6C further illustrate a scene rendered with an altered haze layer, where the fog layer is modulated by random noise at different scales and recolored.

Derivation of the Noise Estimates:

The following provides an example of the derivation of an estimation for the noise present in the transmission t, given by (8). As described above, this analysis is based on modeling the noise present in the input data I as an additive white Gaussian noise with zero mean and variance $\sigma^2$, given by $$I = \tilde{I} + \xi, \quad (20)$$

where $\tilde{I}$ is the true image and the noise $\xi$ is a three-dimensional vector (corresponding to the RGB color channels) with each component at each pixel being an independent Gaussian variable $\xi \sim N(0,\sigma^2)$. This breaks $I_A$ into signal and noise terms, $$I_A = \langle \tilde{I}+\xi, A \rangle / \|A\| = \tilde{I}_A + \xi_A, \qquad (21)$$

with $\tilde{I}_A = \langle \tilde{I}, A \rangle / \|A\|$ and $\xi_A = \langle \xi, A \rangle / \|A\|$. Similarly, for $I_{R'}$ one gets $$\begin{aligned} I_{R'}^2 &= \|I\|^2 - I_A^2 \\ &= \|\tilde{I}\|^2 + 2\langle \tilde{I}, \xi \rangle + \|\xi\|^2 - \tilde{I}_A^2 - 2\tilde{I}_A \xi_A - \xi_A^2 \\ &= \tilde{I}_{R'}^2 + \langle 2\tilde{I} - \xi, \xi - \xi_A A \rangle, \end{aligned} \qquad (22)$$

where $$\tilde{I}_{R'} = \sqrt{\|\tilde{I}\|^2 - \langle \tilde{I}, A \rangle^2},$$

and by assuming that the noise $\xi$ is less than $\tilde{I}$ the quadratic noise terms can be neglected. This leaves $$I_R = \sqrt{\tilde{I}_{R'}^2 + 2 \langle \xi, \tilde{I} - \tilde{I}_A A \rangle}, \qquad (23)$$

and since $\tilde{I}_{R'}^2 = \|\tilde{I} - \tilde{I}_A A\|^2 \xi$ may need to be less than $\tilde{I}_{R'}$ (and not than $\tilde{I}_{R'}^2$) in order to use a first-order Taylor approximation for $\sqrt{x}$ centered around $\tilde{I}_{R'}^2$. This gives $$I_R \approx \tilde{I}_{R'} + \langle \tilde{I}, \xi \rangle - \tilde{I}_A \xi_A) / \tilde{I}_{R'} = \tilde{I}_{R'} + \xi_{R'}, \qquad (24)$$

where $\xi_{R'}$ can be written more explicitly as $$\xi_{R'} = \langle \xi, \tilde{I} - A\tilde{I}_A/\|A\| \rangle / \tilde{I}_{R'}. \qquad (25)$$

Based on the same assumption, $\xi < \tilde{I}_{R'}$, a first-order Taylor approximation can be used for $1/x$ around $\tilde{I}_{R'}$ in order to remove the noise term from the denominator of $h$ $$\begin{aligned} h &\approx (\|A\| - I_A)/\tilde{I}_{R'} - \xi_{R'}(\|A\| - I_A)/\tilde{I}_{R'}^2 = \\ &\phantom{=} (\|A\| - \tilde{I}_A)/\tilde{I}_{R'} - \xi_A/\tilde{I}_{R'} - \xi_{R'}(\|A\| - \tilde{I}_A)/\tilde{I}_{R'}^2 + \xi_{R'}\xi_A/\tilde{I}_{R'}^2 = \\ &\phantom{=} \tilde{h} + \xi_h + O(\|\xi\|^2), \end{aligned} \qquad (26)$$

where $\tilde{h} = (\|A\| - \tilde{I}_A)/\tilde{I}_{R'}$, and $$\xi_h = -(\xi_A + \xi_R \tilde{h})/\tilde{I}_{R'} = \langle \xi, A(\tilde{h}\tilde{I}_A/\tilde{I}_{R'}-1)/\|A\| - \tilde{I}\tilde{h}/\tilde{I}_{R'} \rangle / \tilde{I}_{R'}. \qquad (27)$$

The covariance terms gives $$\begin{aligned} C_\Omega(I_{R'}, h) &= C_\Omega(\tilde{I}_{R'} + \xi_{R'}, \tilde{h} + \xi_h) \\ &= C_\Omega(\tilde{I}_{R'}, \tilde{h}) + C_\Omega(\xi_{R'}, \tilde{h}) + C_\Omega(\tilde{I}_{R'}, \xi_h) + O(\|\xi\|^2) \\ &\approx C_\Omega(\tilde{I}_{R'}, \tilde{h}) + E_\Omega(\xi_{R'} \tilde{h} + \xi_h \tilde{I}_{R'}) - \\ &\phantom{=} E_\Omega(\xi_{R'}) E_\Omega(\tilde{h}) - E_\Omega(\xi_h) E_\Omega(\tilde{I}_{R'}) \\ &= C_\Omega(\tilde{I}_{R'}, \tilde{h}) + \xi C_{R'}, \end{aligned} \qquad (28)$$

where, by taking into account that $\xi_R \tilde{h} + \xi_h \tilde{I}_R = -\xi_A$, the noise term becomes $$\xi C_{R'} = -E_\Omega(\xi_A) - E_\Omega(\xi_{R'}) E_\Omega(\tilde{h}) - E_\Omega(\xi_h) E_\Omega(\tilde{I}_{R'}). \qquad (29)$$

Similarly, one gets $$C_\Omega(I_A, h) \approx C_\Omega(\tilde{I}_A, \tilde{h}) + \xi C_A, \qquad (30)$$

where $$\xi C_A = E_\Omega(\xi_A \tilde{h} + \xi_h \tilde{I}_A) - E_\Omega(\xi_A) E_\Omega(\tilde{h}) - E_\Omega(\xi_h) E_\Omega(\tilde{I}_A). \qquad (31)$$

Finally, under the assumption that $C_\Omega(\tilde{I}_R, \tilde{h})$ is larger than $\xi C_{R'}$, a first-order Taylor expansion of $1/x$ around $C_\Omega(\tilde{I}_R \tilde{h})$ can again be used to get $$\eta = \frac{C_\Omega(\tilde{I}_A, \tilde{h}) + \xi_{C_A}}{C_\Omega(\tilde{I}_{R'}, \tilde{h}) + \xi_{C_{R'}}} \approx \tilde{\eta} + \xi_\eta, \qquad (32)$$

where $$\xi_\eta = \frac{\xi_{C_A} C_\Omega(\tilde{I}_{R'}, \tilde{h}) - \xi_{C_{R'}} C_\Omega(\tilde{I}_A, \tilde{h})}{(C_\Omega(\tilde{I}_{R'}, \tilde{h}))^2}, \qquad (33)$$

and $\tilde{\eta}$ is the noiseless $C_\Omega(\tilde{I}_A, \tilde{h})/C_\Omega(\tilde{I}_{R'}, \tilde{h})$ that is being estimated. Note that $E_\Omega$ and $C_\Omega$ are the mean and variance of the pixels sample in $\Omega$ and have nothing to do with the moments of $\xi$. Finally, from (8) one gets $$t = \tilde{t} + (\xi_A - \tilde{\eta}\xi_R - \tilde{I}_R \xi_\eta - \xi_\eta \xi_{R'})/\|A\| = \tilde{t} + \xi_t, \qquad (34)$$

where $\tilde{t} = 1 - (\tilde{I}_A - \tilde{\eta}\tilde{I}_{R'})/\|A\|$ and $\xi_t = (\xi_A - \tilde{\eta}\xi_R - \tilde{I}_R \xi_\eta)/\|A\|$.

Here the quadratic noise term can be dropped, under the assumption that $\xi_{R'} < \tilde{I}_{R'}$, i.e., $\xi$ is small.

Along this derivation, several assumptions were made which are quantified now. In order for $a\xi + \xi^2$ to still behave like a Gaussian, i.e., have a distribution with a similar shape and a variance of $\approx a^2 \sigma^2$, $\sigma$ may need to be less than $a/10$. In the derivation (23), this condition may require that $\sigma < \tilde{I}/10 \approx I/10$ for each of the RGB components and at each pixel. This is also the case in (34) where $\sigma$ may need to be less than $\frac{1}{10}$. Similarly, in order to remove the noise from $\sqrt{a+\xi}$ and still maintain an approximately Gaussian distribution, $\sigma$ should be less than $a/3$. In the derivation of embodiments described herein, this condition arises in (24) and may require a $\sigma < \tilde{I}_R/6 \approx I_R/6$. The ratio between $a$ and $\xi$ that allows for the movement of the noise from the denominator in $1/(a+\xi)$ and still ending up with approximately a Gaussian variable is a $\sigma < a/5$. This applies to the two cases that were encountered above, the first in (26), which gives a less restrictive condition a $\sigma < (\tilde{I} - \tilde{I}_A A)/5$ than what there already is, and the second case in (32) that may require $$\mathrm{Var}_\xi(\xi C_{R'}) < (C_\Omega(\tilde{I}_R, \tilde{h})/5)^2 \approx (C_\Omega(I_R, h)/5)^2, \qquad (35)$$

where $\mathrm{Var}_\xi$ is the variance with respect to the noise randomness. These conditions were summarized above and an explanation was given as to how this uncertainly is accounted for in the estimation of $t$ in accordance with an embodiment described herein.

The estimated transmission noise term $\xi_t$ is now a linear combination of $\xi$. Therefore its variance can be computed according to the following arithmetic rules for Gaussian variables: (i) $a\xi(x) + b\xi(x) \sim N(0, (a+b)^2 \sigma^2)$, and (ii) $a\xi(x) + b\xi(y) \sim N(0, (a^2+b^2)\sigma^2)$ for any scalars a,b. The variance of $\xi_A$, $\xi_{R'}$, and $\xi_h$ can be computed according to the first rule as no different pixels get mixed together. Mixing occurs in $\xi C_{R'}$ and $\xi C_h$ where the second rule is applied. The first rule can also be used to calculate the variance of the intermediate noise terms $\xi_A \tilde{h} + \xi_h \tilde{I}_A$ in (31) and for $\xi_A - \tilde{\eta}\xi_{R'}$ found in $\xi_t$.

Apparatus for De-Hazing

Figure 9:
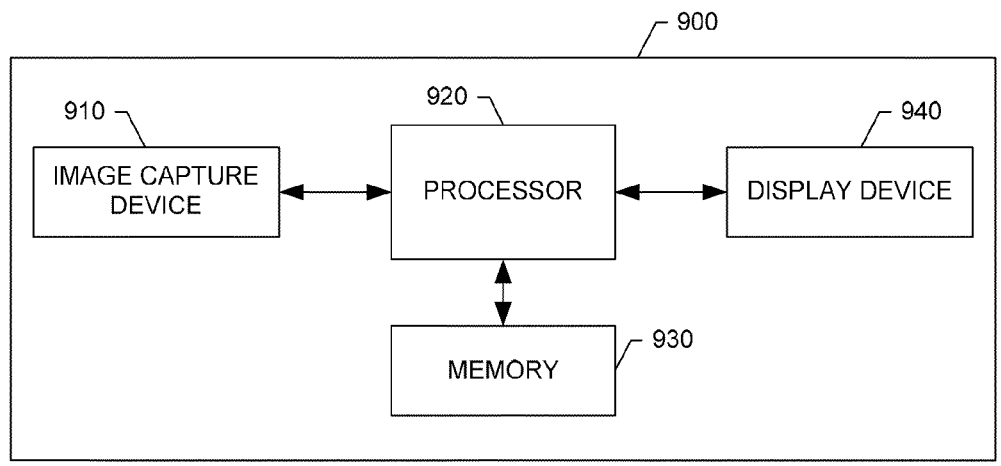
FIG. 9 is a schematic block diagram of an entity capable of operating as an image de-hazing apparatus in accordance with embodiments of the present invention.

Referring to FIG. 9, a block diagram of an example of an apparatus 900 capable of performing the foregoing de-hazing process is shown. The apparatus 900, which may comprise a personal computer (PC), laptop, personal digital assistant (PDA), cellular telephone, digital camera, and/or the like, includes various means for performing one or more functions in accordance with embodiments of the present invention, including those more particularly shown and described herein. It should be understood, however, that the apparatus 900 may include alternative means for performing one or more like functions, without departing from the spirit and scope of embodiments described herein.

In particular, as shown, in one embodiment, the apparatus 900 may, itself, include an image capture device 910 configured to capture a digital image, from which a haze-free image may be recovered in accordance with embodiments described herein. Alternatively, while not shown, according to another embodiment, the image capture device 910 may be external to and in electronic communication with (e.g., via a Universal Serial Bus (USB), or similar, port) the apparatus 900. An example of the former instance may include a PDA having both image capturing and data processing capabilities. An example of the latter instance may include where a digital camera is used to capture a digital image, which may be uploaded to a PC or laptop, wherein the PC or laptop performs the de-hazing process of embodiments described herein.

The apparatus 900 can further generally include means, such as a processor 920 for performing or controlling the various functions of the apparatus 900. In particular, the processor 920 may be configured to perform the processes discussed in more detail above and below with regard to FIG. 10. For example, according to one embodiment the processor 920 may be configured to receive, from the image capture device 910, a single input image I comprising a plurality of pixels, wherein the input image I further comprises a transmission t, a surface radiance vector J, and an airlight color vector A. The processor 920 may further be configured to model the surface radiance vector J as a product of a surface albedo coefficient R and a shading factor l; determine, for each of the plurality of pixels, a value of the transmission t, such that a covariance $C_\Omega$ between the transmission t and the shading factor l is minimized; and recover the surface radiance vector J based at least in part on the determined value of the transmission t for each pixel.

In one embodiment, the processor 920 is in communication with or includes memory 930, such as volatile and/or non-volatile memory that stores content, data or the like. For example, the memory 930 may store content transmitted from, and/or received by, the entity. Also for example, the memory 930 may store software applications, instructions or the like for the processor to perform steps associated with operation of the apparatus 900 in accordance with embodiments of the present invention. In particular, the memory 930 may store software applications, instructions or the like for the processor to perform the operations described above and below with regard to FIG. 10 for de-hazing an input image.

For example, according to one embodiment, the memory 930 may store one or more modules for instructing the processor 920 to perform the operations including, for example, a receiving module, a modeling module, a determining module, and a recovering module. In one embodiment, the receiving module may be configured to receive, from the image capture device 910, a single input image I comprising a plurality of pixels, wherein the input image I further comprises a transmission t, a surface radiance vector J, and an airlight color vector A. The modeling module may be configured to instruct the processor 920 to model the surface radiance vector J as a product of a surface albedo coefficient R and a shading factor l. The determining module may be configured to instruct the processor 930 to determine, for each of the plurality of pixels, a value of the transmission t, such that a covariance $C_\Omega$ between the transmission t and the shading factor l is minimized. Finally, the recovery module may be configured to instruct the processor 930 to recover the surface radiance vector J based at least in part on the determined value of the transmission t for each pixel.

In addition to the memory 930, the processor 920 can also be connected to at least one interface or other means for displaying, transmitting and/or receiving data, content or the like. In this regard, the interface(s) can include at least one communication interface or other means for transmitting and/or receiving data, content or the like (not shown), as well as at least one user interface that can include a display 940 and/or a user input interface. The user input interface (not shown), in turn, can comprise any of a number of devices allowing the entity to receive data from a user, such as a keypad, a touch display, a joystick or other input device.

Figure 10:
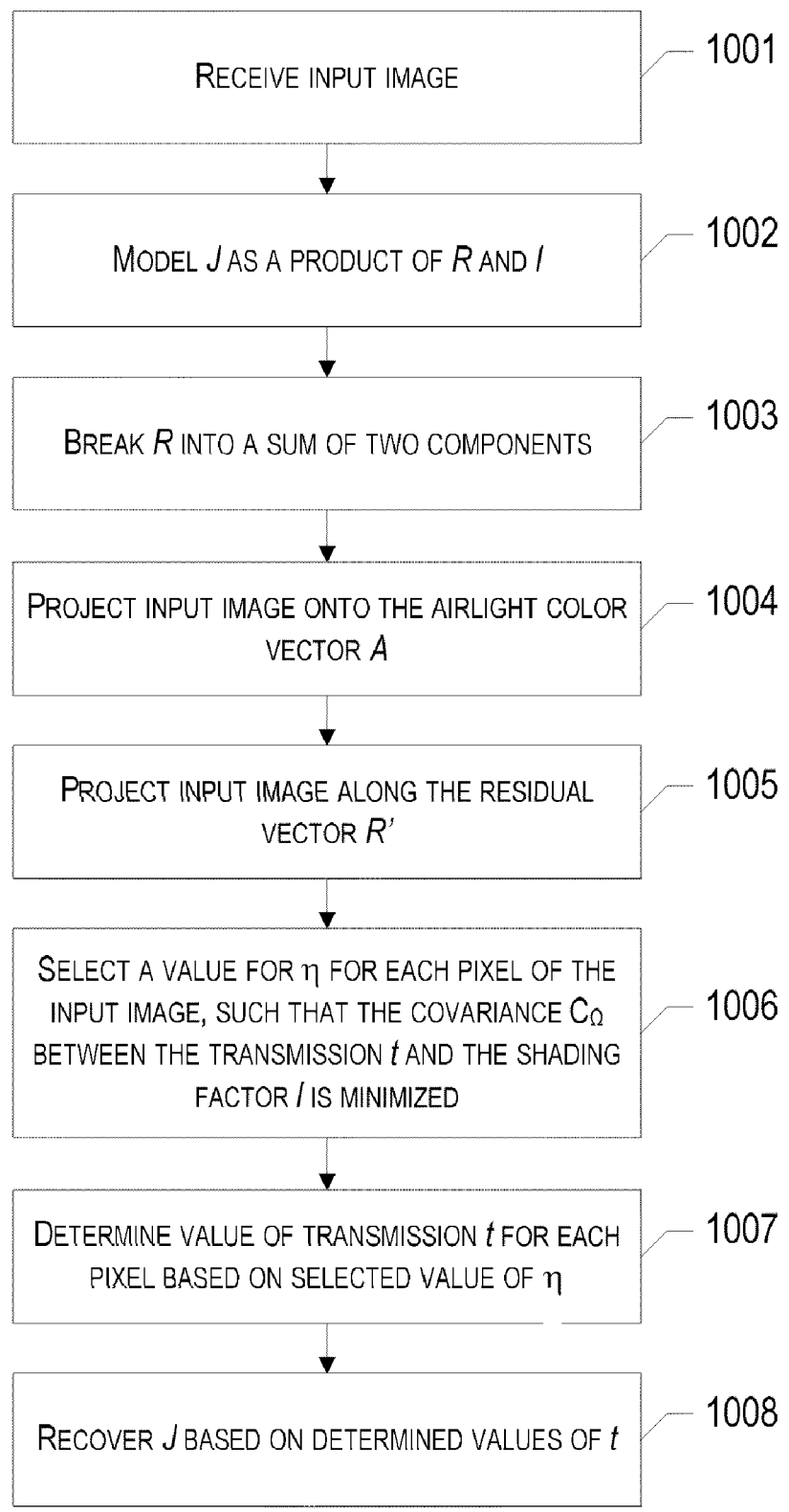
FIG. 10 is a flow chart illustrating the process of de-hazing an image in accordance with an embodiment described herein.

Method of De-Hazing Using a Single Input Image:

Reference is now made to FIG. 10, which provides a summary of the foregoing process for recovering a haze-free image given a single input image and using the de-hazing apparatus 900 in accordance with an embodiment described herein. As shown, the process may begin at Block 1001 when the de-hazing apparatus 900 and, in particular, the processor 920 associated with the de-hazing apparatus 900 (e.g., executing the receiving module), receives a single input image I made up of a plurality of pixels. As noted above, the image may be captured by an external image capture device 910 and transmitted to the apparatus 900, or the image may be captured by an internal image capture device 910, such that subsequent transmission is not needed. As described above, in one embodiment, the image I may comprise a transmission t, a surface radiance vector J, and an airlight color vector A.

In order to remove the haze of the received image I, the apparatus 900 (e.g., the processor 920 executing the modeling module) may, at Block 1002 model the surface radiance vector J as a product of a surface albedo coefficient R and a shading factor l (See equation (4)). The apparatus 900 (e.g., processor 920) may then, at Block 1003 break the surface albedo coefficient R into a sum of two components, a first component parallel to the airlight color vector A and a second component comprising a residual vector R', wherein the residual vector R' comprises an amount of airlight expressed by an unknown scalar value η (See equation (5)).

The apparatus 900 (e.g., processor 920) may then project the input image I onto the airlight color vector A to create an airlight projection $I_A$, as well as along the residual vector R' to create a residual projection $I_{R'}$ (See equations (6) and (7), respectively). (Blocks 1004 and 1005). A value for η may then be selected for each pixel of the input image I (e.g., by the processor 920), such that a covariance $C_\Omega$ between the transmission t and the shading factor l is minimized, wherein η is based at least in part on the airlight projection $I_A$ and the residual projection $I_{R'}$ (See equations (12), (13) and (16)). (Block 1006).

A value of the transmission t for each pixel can then be determined (e.g., by the processor 920) based at least in part on the selected value for η (Block 1007), and the surface radiance vector J (i.e., a haze-free image) can be recovered based at least in part on the determined value of the transmission t for each pixel (Block 1008).

CONCLUSION

As described above, embodiments of the present invention provide a method for estimating the transmission in hazy scenes based on minimal input—a single image. This new approach is physically sound and relies only on the assumption that the transmission and surface shading are locally uncorrelated. The use of robust statistics can enable coping with complicated scenes containing different surface albedos, and the use of an implicit graphical model can make it possible to extrapolate the solution to pixels where no reliable estimate is available. Despite the challenges in resolving the ambiguities involved in this problem, the images produced by the method of embodiments described herein offer a lucid view of the scene and regain contrast that is typical to haze-free scenes.

Figure 11:
FIG. 11 illustrates the negative impact of insufficient signal-to-noise ratio or the absence of multiplicative variation in significant portions of the image on the method of embodiments described herein.

The method of one embodiment solves a non-linear inverse problem. Accordingly, its performance depends, to some extent, on the quality of the input data. An estimation for the noise present in the input may be derived and statistical extrapolation may be used to cope with large errors. Nevertheless, insufficient signal-to-noise ratio or the absence of multiplicative variation in significant portions of the image may negatively impact the method of embodiments described herein. These scenarios are easy to find, however, and in FIG. 11, one such example is shown. In particular, the $I_{R'}$ at the roof of the image is near zero, which may cause an overshoot in the estimated transmission. In addition, when too few pixels are available, the accuracy of the statistical estimation may be undermined, such as in the case of the white flowers in FIGS. 1A-1C.

While haze removal from images provides a clearer view of the scene, it may not be regarded as a default preference. On the contrary, the presence of haze can be desired for many reasons. For example, it is known to be an important monocular depth cue (See Coon, D, *Psychology: A Modular Approach To Mind And Behavior*, Wadsworth Pub Co, July, 2005, the contents of which are hereby incorporated herein by reference in their entirety). In addition, painters use a technique called atmospheric perspective where they wash out regions of the painting using white paint to create an illusion of depth.

Recent theories of perceptual transparency (See Singh, M., et al., "Toward a perceptual theory of transparency," No. 109, 492-519, 2002, the contents of which are hereby incorporated herein by reference in their entirety) suggest that human observers perceive the medium transmission based on the contrast ratio of a pattern seen through a semi-transparent filter and through a clear medium. Although it may not be assumed here that any haze-free data is available, variations in surface shading may also be relied on in order to disambiguate and require a significant $C(I_{R'}, h)$.

As described above and as will be appreciated by one skilled in the art, embodiments of the present invention may be configured as a method or electronic device/apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processor 920 discussed above with reference to FIG. 9, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 920 of FIG. 9) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions. Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, from an image capture device, a single input image I comprising a plurality of pixels;
   modeling a surface radiance vector J of the input image I as a product of a surface albedo coefficient R and a shading factor l;
   determining, by a processor for each of the plurality of pixels, a value of a transmission t of the pixel, such that a covariance $C_\Omega$ between the transmission t and the shading factor l is minimized; and
   recovering, by the processor, the surface radiance vector J based at least in part on the determined value of the transmission t for each pixel.

2. The method of claim 1 further comprising:
- breaking the surface albedo coefficient R into a sum of two components, a first component parallel to an airlight color vector A and a second component comprising a residual vector R', wherein the residual vector R' comprises an amount of airlight expressed by an unknown scalar value η;
- projecting the input image I onto the airlight color vector A to create an airlight projection $I_A$; and
- projecting the input image I along the residual vector R' to create a residual projection $I_{R'}$.

3. The method of claim 2, wherein determining, for each of the plurality of pixels, a value of the transmission t further comprises:
- selecting, for each of the plurality of pixels, a value for η, such that the covariance $C_\Omega$ between the transmission t and the shading factor l is minimized, wherein η is based at least in part on the airlight projection $I_A$ and the residual projection $I_{R'}$; and
- determining, for each of the plurality of pixels, a value of the transmission t based at least in part on the selected value for η.

4. The method of claim 3, wherein the covariance $C_\Omega$ is defined as follows for any two functions $f$ and g $$C_x(f, g) = \frac{1}{W_x} \sum_{y \in \Omega_x} (f(y) - E_x(f))(g(y) - E_x(g))w(x, y),$$

and $$E_x(f) = \frac{1}{W_x} \sum_{y \in \Omega_x} f(y)w(x, y),$$

wherein x represents a pixel at location (x,y), $W_x$ represents a normalizing weight given by $W_x = \Sigma_{y \in \Omega_x} w(x,y)$, $\Omega_x$ represents a window of pixels centered around x, $E_x$ represents a mean of $f$ in a window around x for every function $f$, and w(x,y) represents a weighting function given by $\exp(-d(\theta(x), \theta(y))^2/\sigma_\theta^2)$, wherein d represents a distance function, θ represents a measure of chromaticity, and $\sigma_\theta^2$ is a scale parameter.

5. The method of claim 2, wherein the airlight projection $I_A$ is defined by $I_A(x) = \langle I(x), A \rangle / \|A\| = t(x)l'(x)\eta + (1-t(x))\|A\|$, wherein l' represents a scaled shading factor.

6. The method of claim 2, wherein the residual projection $I_{R'}$ is defined by $I_{R'}(x) = \sqrt{\|I(x)\|^2 - I_A(x)^2} = t(x)l'(x)$, wherein l' represents a scaled shading factor.

7. The method of claim 3, wherein determining, for each of the plurality of pixels, a value of the transmission t based at least in part on the selected value for η further comprises:
- computing, for each of the plurality of pixels, an estimate of the transmission $\hat{t}$ based at least in part on the selected value for η;
- computing, for each of the plurality of pixels, a noise variance $\sigma_t$ in $\hat{t}$; and
- computing, for each of the plurality of pixels, the transmission t based at least in part on the noise variance $\sigma_t$.

8. The method of claim 7, wherein computing, for each of the plurality of pixels, the transmission t based at least in part on the noise variance $\sigma_t$ further comprises computing the transmission t using a Gauss-Markov random field model.

9. The method of claim 7, wherein computing, for each of the plurality of pixels, the transmission t based at least in part on the noise variance $\sigma_t$ further comprises:
- comparing the noise variance $\sigma_t$ of each pixel to a threshold;
- discarding one or more pixels of the plurality of pixels based at least in part on the comparison; and
- computing the transmission t for each remaining pixel.

10. A method comprising:
- receiving, from an image capture device, a single input image I comprising a plurality of pixels;
- modeling a surface radiance vector J of the input image I as a product of a surface albedo coefficient R and a shading factor l;
- breaking the surface albedo coefficient R into a sum of two components, a first component parallel to an airlight color vector A and a second component comprising a residual vector R', wherein the residual vector R' comprises an amount of airlight expressed by an unknown scalar value η;
- projecting the input image I onto the airlight color vector A to create an airlight projection $I_A$;
- projecting the input image I along the residual vector R' to create a residual projection $I_{R'}$;
- selecting, by a processor for each of the plurality of pixels, a value for η, such that a covariance $C_\Omega$ between a transmission t of the pixel and the shading factor l is minimized, wherein η is based at least in part on the airlight projection $I_A$ and the residual projection $I_{R'}$;
- determining, by the processor for each of the plurality of pixels, a value of the transmission t based at least in part on the selected value for η; and
- recovering, by the processor, the surface radiance vector J based at least in part on the determined value of the transmission t for each pixel.

11. An apparatus comprising:
a processor configured to:
- receive, from an image capture device, a single input image I comprising a plurality of pixels;
- model a surface radiance vector J of the input image I as a product of a surface albedo coefficient R and a shading factor l;
- determine, for each of the plurality of pixels, a value of a transmission t of the pixel, such that a covariance $C_\Omega$ between the transmission t and the shading factor l is minimized; and
- recover the surface radiance vector J based at least in part on the determined value of the transmission t for each pixel.

12. The apparatus of claim 11, wherein the processor is further configured to:
- break the surface albedo coefficient R into a sum of two components, a first component parallel to an airlight color vector A and a second component comprising a residual vector R', wherein the residual vector R' comprises an amount of airlight expressed by an unknown scalar value η;
- project the input image I onto the airlight color vector A to create an airlight projection $I_A$; and
- project the input image I along the residual vector R' to create a residual projection $I_{R'}$.

13. The apparatus of claim 12, wherein in order to determine, for each of the plurality of pixels, a value of the transmission t, the processor is further configured to:
- select, for each of the plurality of pixels, a value for η, such that the covariance $C_\Omega$ between the transmission t and the shading factor l is minimized, wherein η is based at least in part on the airlight projection $I_A$ and the residual projection $I_{R'}$; and determine, for each of the plurality of pixels, a value of the transmission t based at least in part on the selected value for η.

14. The apparatus of claim 13, wherein the covariance $C_\Omega$ is defined as follows for any two functions $f$ and $g$ $$C_x(f, g) = \frac{1}{W_x} \sum_{y \in \Omega_x} (f(y) - E_x(f))(g(y) - E_x(g))w(x, y),$$

and $$E_x(f) = \frac{1}{W_x} \sum_{y \in \Omega_x} f(y)w(x, y),$$

wherein x represents a pixel at location (x,y), $W_x$ represents a normalizing weight given by $W_x = \Sigma_{y \in \Omega_x} w(x,y)$, $\Omega_x$ represents a window of pixels centered around x, $E_x$ represents a mean of $f$ in a window around x for every function $f$, and w(x,y) represents a weighting function given by $\exp(-d(\theta(x), \theta(y))^2/\sigma_\theta^2)$, wherein d represents a distance function, θ represents a measure of chromaticity, and $\sigma_\theta^2$ is a scale parameter.

15. The apparatus of claim 12, wherein the airlight projection $I_A$ is defined by $I_A(x) = \langle I(x), A \rangle / \|A\| = t(x)l'(x)\eta + (1-t(x))\|A\|$, wherein l' represents a scaled shading factor.

16. The apparatus of claim 12, wherein the residual projection $I_{R'}$ is defined by $I_R(x) = \sqrt{\|I(x)\|^2 - I_A(x)^2} = t(x)l'(x)$, wherein l' represents a scaled shading factor.

17. The apparatus of claim 13, wherein in order to determine, for each of the plurality of pixels, a value of the transmission t based at least in part on the selected value for η, the processor is further configured to:
   compute, for each of the plurality of pixels, an estimate of the transmission $\hat{t}$ based at least in part on the selected value for η;
   compute, for each of the plurality of pixels, a noise variance $\sigma_t$ in $\hat{t}$; and
   compute, for each of the plurality of pixels, the transmission t based at least in part on the noise variance $\sigma_t$.

18. The apparatus of claim 17, wherein in order to compute, for each of the plurality of pixels, the transmission t based at least in part on the noise variance $\sigma_t$, the processor is further configured to compute the transmission t using a Gauss-Markov random field model.

19. The apparatus of claim 17, wherein in order to compute, for each of the plurality of pixels, the transmission t based at least in part on the noise variance $\sigma_t$, the processor is further configured to:
   compare the noise variance $\sigma_t$ of each pixel to a threshold;
   discard one or more pixels of the plurality of pixels based at least in part on the comparison; and
   compute the transmission t for each remaining pixel.

20. A computer program product comprising a non-transitory computer-readable storage medium having computer-readable program code portions stored therein, said computer-readable program code portions comprising:
   a first executable portion for receiving, from an image capture device, a single input image I comprising a plurality of pixels;
   a second executable portion for modeling a surface radiance vector J of the input image I as a product of a surface albedo coefficient R and a shading factor l;
   a third executable portion for determining, for each of the plurality of pixels, a value of a transmission t of the pixel, such that a covariance $C_\Omega$ between the transmission t and the shading factor l is minimized; and
   a fourth executable portion for recovering the surface radiance vector J based at least in part on the determined value of the transmission t for each pixel.

21. The computer program product of claim 20, wherein the computer-readable program code portions further comprise:
   a fifth executable portion for breaking the surface albedo coefficient R into a sum of two components, a first component parallel to an airlight color vector A and a second component comprising a residual vector R', wherein the residual vector R' comprises an amount of airlight expressed by an unknown scalar value η;
   a sixth executable portion for projecting the input image I onto the airlight color vector A to create an airlight projection $I_A$; and
   a seventh executable portion for projecting the input image I along the residual vector R' to create a residual projection $I_{R'}$.

22. The computer program product of claim 21, wherein the third executable portion is further configured to:
   select, for each of the plurality of pixels, a value for η, such that the covariance $C_\Omega$ between the transmission t and the shading factor l is minimized, wherein η is based at least in part on the airlight projection $I_A$ and the residual projection $I_{R'}$; and
   determine, for each of the plurality of pixels, a value of the transmission t based at least in part on the selected value for η.

23. The computer program product of claim 22, wherein the covariance $C_\Omega$ is defined as follows for any two functions $f$ and $g$ $$C_x(f, g) = \frac{1}{W_x} \sum_{y \in \Omega_x} (f(y) - E_x(f))(g(y) - E_x(g))w(x, y),$$

and $$E_x(f) = \frac{1}{W_x} \sum_{y \in \Omega_x} f(y)w(x, y),$$

wherein x represents a pixel at location (x,y), $W_x$ represents a normalizing weight given by $W_x = \Sigma_{y \in \Omega_x} w(x,y)$, $\Omega_x$ represents a window of pixels centered around x, $E_x$ represents a mean of $f$ in a window around x for every function $f$, and w(x,y) represents a weighting function given by $\exp(-d(\theta(x), \theta(y))^2/\sigma_\theta^2)$, wherein d represents a distance function, θ represents a measure of chromaticity, and $\sigma_\theta^2$ is a scale parameter.

24. The computer program product of claim 21, wherein the airlight projection $I_A$ is defined by $I_A(x) = \langle I(x), A \rangle / \|A\| = t(x)l'(x)\eta + (1-t(x))\|A\|$, wherein l' represents a scaled shading factor.

25. The computer program product of claim 21, wherein the residual projection $I_{R'}$ is defined by $I_R(x) = \sqrt{\|I(x)\|^2 - I_A(x)^2} = t(x)l'(x)$, wherein l' represents a scaled shading factor.

26. The computer program product of claim 22, wherein in order to determine, for each of the plurality of pixels, a value of the transmission t based at least in part on the selected value for η, the third executable portion is further configured to:
   compute, for each of the plurality of pixels, an estimate of the transmission $\hat{t}$ based at least in part on the selected value for η;

compute, for each of the plurality of pixels, a noise variance $\sigma_t$ in $\hat{t}$; and compute, for each of the plurality of pixels, the transmission t based at least in part on the noise variance $\sigma_t$.

27. The computer program product of claim 26, wherein in order to compute, for each of the plurality of pixels, the transmission t based at least in part on the noise variance $\sigma_t$, the third executable portion is further configured to compute the transmission t using a Gauss-Markov random field model.

28. The computer program product of claim 26, wherein in order to compute, for each of the plurality of pixels, the transmission t based at least in part on the noise variance $\sigma_t$, the third executable portion is further configured to:
- compare the noise variance $\sigma_t$ of each pixel to a threshold;
- discard one or more pixels of the plurality of pixels based at least in part on the comparison; and
- compute the transmission t for each remaining pixel.

* * * * *